Figure 1:
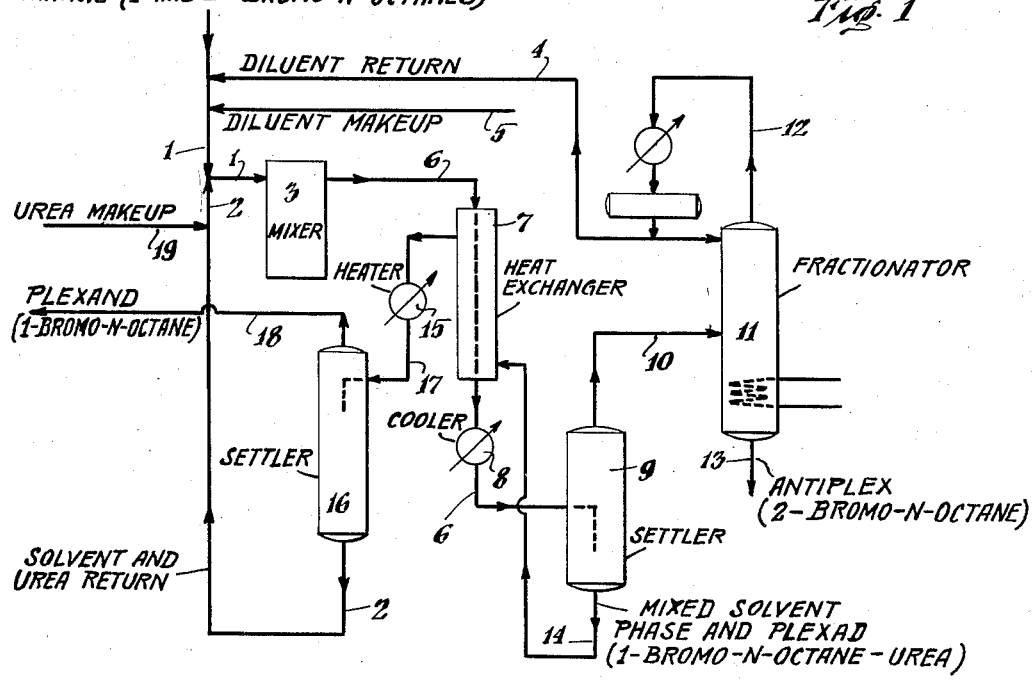

Aug. 21, 1956  E. GORIN  2,759,919
CRYSTALLINE COMPLEXES OF UREA AND STRAIGHT
CHAIN ALKYL MONOHALIDES
Original Filed Sept. 13, 1949  2 Sheets-Sheet 1

INVENTOR
Everett Gorin
BY
Robert D. Flynn
AGENT OR ATTORNEY

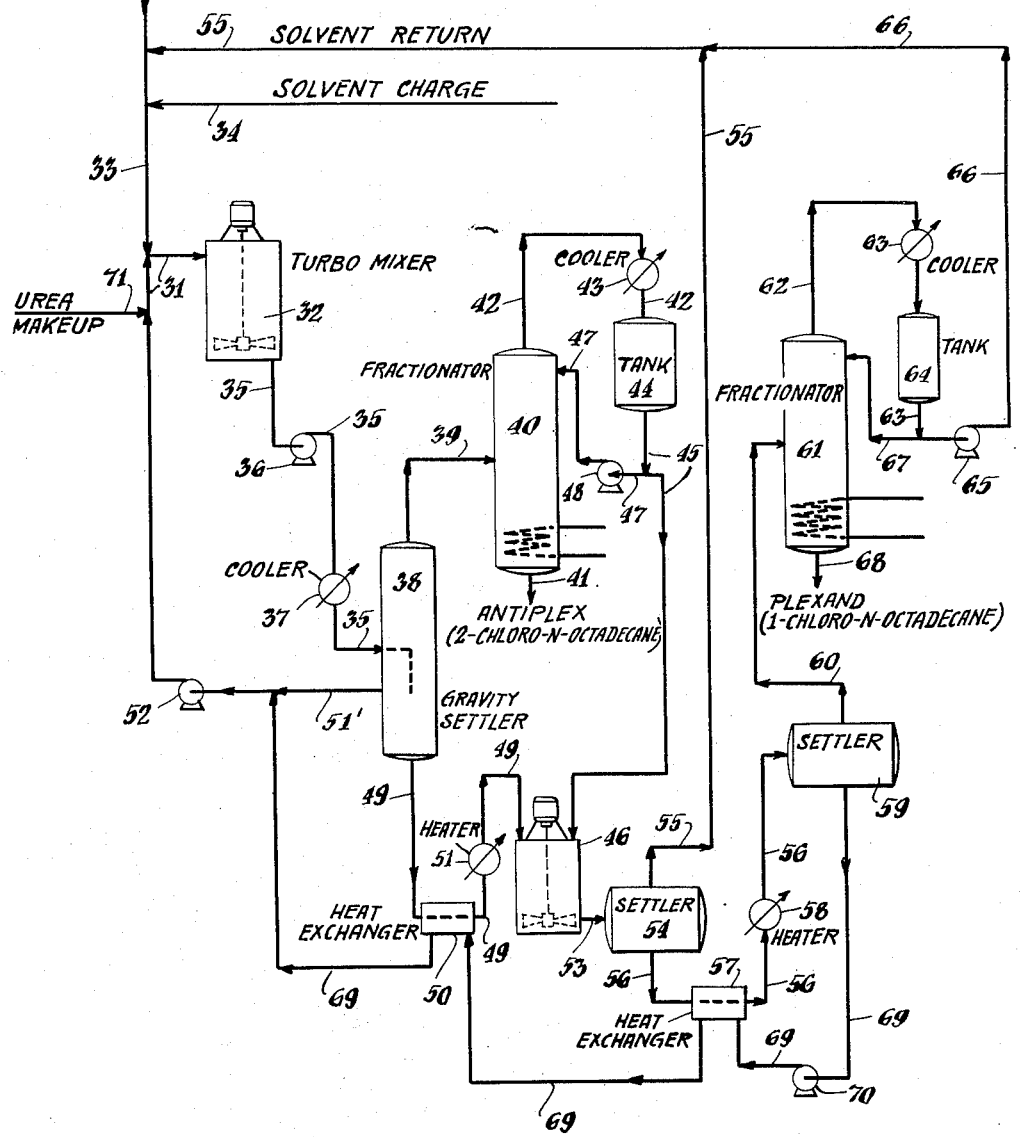

United States Patent Office 2,759,919
Patented Aug. 21, 1956

2,759,919

CRYSTALLINE COMPLEXES OF UREA AND STRAIGHT CHAIN ALKYL MONOHALIDES

Everett Gorin, Pittsburgh, Pa., assignor to Socony Mobil Oil Company, Inc., a corporation of New York Continuation of application Serial No. 115,511, September 13, 1949. This application August 17, 1953, Serial No. 374,707

5 Claims. (Cl. 260—96.5)

This invention has to do with the separation of hydrocarbons and hydrocarbon derivatives of different molecular configuration from mixtures containing the same, and also has to do with the preparation of new and novel compositions.

This application is a continuation of application Serial No. 115,511, filed September 13, 1949, now abandoned, which, in turn, is a continuation-in-part of application Serial No. 4,997, filed January 29, 1948, now abandoned.

I. FIELD OF INVENTION

Numerous processes have been developed for the separation of hydrocarbons and hydrocarbon derivatives of different molecular configuration by taking advantage of their selective solubility in selected reagents or solvents from which they may later be separated. Exemplary of hydrocarbon separation procedures is the Edeleanu process, wherein paraffinic materials are separated from aromatics by virtue of the greater solubility of aromatics in liquid sulfur dioxide. Lubricant oil solvent refining processes, solvent deasphalting, solvent dewaxing and the like are further examples of the separation of hydrocarbons of different molecular configuration. Typical of selective solvent procedures for separating hydrocarbon derivatives is the separation of paraffin wax, monochlorwax and polychlorwaxes, with acetone as the selective solvent.

This invention is concerned with the general field outlined above, but based upon a different and little-known phenomenon, namely, the differing ability of hydrocarbons and hydrocarbon derivatives to enter into and to be removed from certain crystalline complexes. As used herein, the term "complex" broadly denotes a combination of two or more compounds.

This invention is predicated upon the knowledge that urea forms complex crystalline compounds to a varying degree with various forms of hydrocarbons and hydrocarbon derivatives.

II. PRIOR ART

For some years it has been known that various isomers of aromatic hydrocarbon derivatives form complexes with urea. Kremann (Monatshefte f. Chemie 28, 1125 (1907)) observed that complexes, designated as "double compounds," of urea and the isomeric cresols are stable at different temperatures. Schotte and Priewe (1,830,-859) later separated meta-cresol from the corresponding para isomer by selectively forming a meta-cresol-urea complex, which was described as an "addition compound"; the latter compound was separated from the para isomer and then split up by distillation or with water or acid to obtain pure meta-cresol. The "addition compound" of meta-cresol and urea was shown thereafter to have utility as a disinfectant (Priewe—1,933,757). Bentley and Catlow (1,980,901) found a number of aromatic amines containing at least one basic amino group capable of forming "double compounds" with certain isomeric phenols. It has also been shown that trans-oestradiol can be separated from the corresponding cis-compound by forming a difficultly soluble compound of urea and trans-oestradiol (Priewe—2,300,134).

The forces between urea and the compounds of the foregoing complexes are due to specific chemical interaction between the various functional groups.

One heterocyclic compound, 2:6 lutidine, has been found to form a crystalline compound with urea, thus affording a means of separating the lutidine from beta- and gamma-picolines (Riethof 2,295,606).

Comparatively few aliphatic hydrocarbon derivatives have been known to date to form complex compounds with urea. In German patent application B 190,197, IV d/12 (Technical Oil Mission, Reel 143; Library of Congress, May 22, 1946), Bengen described a method for the separation of aliphatic oxygen-containing compounds (acids, alcohols, aldehydes, esters and ketones) and of straight chain hydrocarbons of at least six carbon atoms from mixtures containing the same, the method being predicated upon the ability of such compounds and hydrocarbons to form "Additions-Produkt" with urea. In the Technical Oil Mission translation of the Bengen application, however, the urea complexes were designated "adducts," which term apparently stems from the anglicized "addition product."

III. DEFINITIONS

From the foregoing discussion of prior art (II), it will be clear that a variety of terms have been applied to urea complexes. The latter have been rather loosely described as "double compounds," "addition compounds," "difficultly soluble compounds," "Additions-Produkt," and "adducts." All of these terms are somewhat ambiguous in that they have also been used to describe products or complexes of different character than the urea complexes under consideration. This is particularly so with the term "adduct," and the related term "unadducted material." While the term "adduct" is simple and convenient, is an unfortunate designation, inasmuch as it confuses these complexes with other substances known in the chemical art. Specifically, "adduct" has been applied to Diels-Alder reaction products, formed by reaction of conjugated diolefins and olefins and their derivatives. As is well known, Diels-Alder products, as a rule do not revert to their original constituents when heated or treated with water, acids, solvents, etc. Moreover, the term "adduct" has been defined earlier as "The product of a reaction between molecules, which occurs in such a way that the original molecules or their residues have their long axes parallel to one another." (Concise Chemical and Technical Dictionary.) Further ambiguity is introduced by the term "adduction," which has been defined as "oxidation." (Hackh).

To avoid the foregoing conflicting terminology, several related terms have been coined to define with greater specificity the substances involved in the phenomenon under consideration. As contemplated herein and as used throughout the specification and appended claims, the following terms identify the phenomenon:

Plexad—a revertable associated complex comprising a plexor, such as urea, and at least one other compound; said plexad characterized by reverting or decomposing, under the influence of heat and/or various solvents, to its original constituents, namely, a plexor and at least one plexand.

Plexand—a compound capable of forming a plexad with a plexor, such as urea; compounds of this character differ in their capacity to form plexads, depending upon various factors described hereinafter;

Antiplex—a compound incapable of forming a plexad with a plexor.

Plexor—a compound capable of forming a plexad with a plexand; such as urea.

Plexate—to form a plexad.

Plexation—the act, process or effect of plexating.

IV. OUTLINE OF INVENTION

It has now been discovered that certain terminally-substituted straight chain compounds, plexands, form plexads with urea. It has also been discovered that, by selective plexation with urea, a terminally-substituted straight chain compound can be separated, in the form of a plexad, from a mixture containing the same and a non-terminally-substituted compound. This separation procedure is effective also when the paraffin derivatives have the same number of carbon atoms, as in the case of isomers, or have a different number of carbon atoms. Selective plexation is also effective when the terminal and non-terminal substituents are different, and the number of carbon atoms of the substituted paraffins are the same or diffrent.

The substituent groups which may characterize the terminally-substituted compounds are inorganic and organic groups of the following character:

(a) Halogen: F, Cl, Br and I;

(b) Nitrogen-containing: $NH_2$, $NH(R)$, $NR_2$, $NO_2$, NOH, CN, $CONH_2$, $CONH(R)$, $CON(R)_2$, CNO, CNS, NCO, NCS, etc., wherein R is a hydrocarbon radical;

(c) Sulfur-containing: SH, SR, $SO_3H$, $OSO_3H$, $SO_2H$, $SO_2R$, wherein R is a hydrocarbon radical, $SO_2Z$ wherein Z is a halogen atom, or group such as hydrocarbon, hetero, etc.

(d) Cyclic: Cycloalkyl such as cyclopropyl, cyclobutyl, cyclopentyl, cyclohexyl, cycloheptyl, chlorcyclohexyl, etc.; aryl such as phenyl and chlorphenyl; hetero such as thienyl $C_4H_3S$, furyl $C_4H_3O$, pyrryl, $C_4H_4N$, pyridyl $C_5H_4N$, thiazyl $C_3H_2NS$, pyrazolyl $C_3H_3N_2$, piperydyl $C_5H_{10}N$, etc.;

(e) Alkenyl: methylene, vinyl, etc.;

(f) Haloalkyl: dichlormethyl $Cl_2CH$—, etc.

As contemplated herein, the invention makes possible the separation of one or more plexands from a mixture containing the same, such plexand or plexands being separated in the form of a plexad or plexads which, as described in detail hereinbelow, revert to the plexor, urea, and the plexand or plexands under certain conditions. The separation, therefore, is an excellent means for obtaining, in pure or concentrated form, one or more plexands or antiplexes whichever is the desired material. The invention also provides a means of forming new compositions of matter, namely, a number of plexads which may be used as a source of a plexor, urea, or as a source of a plexand.

V. OBJECTS

It is an object of this invention, therefore, to provide an effective means for separating hydrocarbons and hydrocarbon derivatives of different molecular configuration from mixtures containing the same.

It is also an object of this invention to selectively separate terminally-substituted straight chain compounds from mixtures containing the same.

A further object is to separate a terminally-substituted straight chain compound from a mixture containing the same and a non-terminally substituted isomer.

Still another object is to separate a terminally-substituted straight chain compound from a mixture containing the same and a non-terminally-substituted straight chain compound having a different number of carbon atoms.

An additional object is to separate a terminally-substituted straight chain compound from a non-terminally substituted compound, wherein the substituents are different and the number of carbon atoms of the respective compounds are the same. A related object is to separate a terminally-substituted straight chain compound from a non-terminally-substituted compound, wherein the substituents are different and the number of carbon atoms of the respective compounds are different.

A further object is to separate a non-terminally substituted compound from a mixture containing the same and a second non-terminally substituted compound less susceptible to plexation.

Another important object is the provision of a continuous method of separation of said plexands and antiplexes, which method is flexible, capable of relatively sharp separation, and not highly demanding of attention and of utilities such as heat, refrigeration, pumping power, and the like.

An additional object is to provide a plexand or plexands substantially free of an antiplex or antiplexes. A corresponding object is the provision of an antiplex or antiplexes substantially free of said plexand or plexands.

Another object is to provide a new and novel class or sub-classes of plexands comprising a plexand and urea. A related object is the provision of a new and novel class or sub-classes of plexads comprising a secondary plexand and urea.

Other objects and advantages of the invention will be apparent from the following description.

VI. INVENTION IN DETAIL

As indicated above, it has been found that the foregoing objects are achieved by plexation with urea (a plexor) of a plexand or plexands.

(1) Plexands

Plexands contemplated herein are represented by the general Formula A:

(A) 

wherein $n$ is a whole number and wherein X is a substituent group of the character described above, with $n$ and X being interrelated.

The substituent group X may be any of the types outlined above subject, however, to one important restriction, namely, that of geometrical size. Two dimensions are of importance in determining the nature of the separation that may be obtained between compounds—plexands and antiplexes—given above. The first dimension is the cross-section of the group (X) taken in a direction perpendicular to the bond joining the group (X) to the parent hydrocarbon. This distance—"width"—is taken at the widest portion of the group and may be conveniently given a quantitative measure as the distance from between outer covalent radii of the two most widely separated atoms along the cross-section of the group where the covalent radii are those given by Pauling (Pauling—"Nature of the Chemical Bond"; Cornell University Press; Ithaca, N. Y.; 1939). The second distance—"length"—is the projection along the bond joining the group to the parent hydrocarbon of the distance from the center of the carbon atom to which the group is attached, to the center of the atom whose covalent radius shell extends furthest in the direction of said bond, plus the covalent radius of said bond.

The first distance determines the length of the aliphatic chain required to obtain plexation at room temperature (25° C.) with a saturated urea solution, a plexor, when the group (X) in question is attached to the terminal carbon atom of the aliphatic chain. In the case of composite groups of the type —COY, —$CH_2COY$ and —$CH_2Y$, where Y is a non-aliphatic radical such as chlorine or amino, the =CO, —$CH_2CO$ and —$CH_2$— constituents, respectively, are considered as part of the aliphatic chain and the width computed is that for the radical Y.

The "widths" of a number of typical groups computed according to the method given above are listed in order of size in Table I below:

TABLE I.—"WIDTH" OF VARIOUS GROUPS IN A°

| | | | |
|---|---|---|---|
| —CN | 1.20 | —SH | 2.67 |
| —F | 1.28 | —NO₂ | 3.32 |
| —Cl | 1.98 | —SO₃H | 3.69 |
| —CH₂Cl | 1.98 | Thienyl | 4.38 |
| —NH₂ | 2.11 | Cyclohexyl | 4.74 |
| —CONH₂ | 2.11 | Phenyl | 5.15 |
| —Br | 2.28 | 2 or 3 Methyl Cyclohexyl | 5.49 |
| —I | 2.66 | O- or M-tolyl | 6.09 |

The correlation between the "width" of the group and the length of the aliphatic chain required for plexad formation at room temperature is an approximate one. This relationship depends to some extent upon the nature of the group (X) as well as upon the "width" of the group (X). For example, in the case where two groups (X) are the same size, the group which imparts a higher melting point to the substituted paraffin will form the stronger plexad, i. e., will form a plexad when the aliphatic chain is somewhat shorter in length.

Only the carbon atoms in the chain are considered to contribute to the chain length, that is atoms such as oxygen, sulfur, nitrogen, etc., are not included in the atom total. Accordingly, then, the straight chain compounds contemplated herein include straight chain aliphatic hydrocarbons and straight chain aliphatic hydrocarbons in which one or more of the carbon atoms of the chain have been replaced by such atoms as oxygen, sulfur, nitrogen, and the like.

It is possible, however, to give the unequivocal limits for the relation between "width" of the group (X) and size of the carbon chain required for plexation with urea at room temperature, 25° C. These limits are set forth in Table II below:

TABLE II.—CORRELATION BETWEEN "WIDTH" OF GROUP (X) AND MINIMUM CHAIN LENGTH FOR UREA PLEXATION AT 25° C.

| Group | "Width" (in A°) | Minimum Chain Length, Number of Carbon Atoms |
|---|---|---|
| 1 | <2.3 | 5–8 |
| 2 | 2.3–3.7 | 8–12 |
| 3 | 3.7–5.2 | 12–18 |
| 4 | >5.2 | >18 |

It is to be understood that these limits apply for plexation at temperatures of the order of about 25° C. The minimum number of carbon atoms in the chain is generally lower for plexation at lower temperatures, but generally not more than one or two carbon atoms lower. In the same vein, for an increase in temperature, a correspondingly higher number of carbon atoms will be required in the carbon chain.

By way of illustration, the following compounds are typical plexads:

(a) Halogen compounds: n-heptyl fluoride, n-heptyl bromide, n-octyl chloride, n-octyl bromide, n-hexadecyl chloride, n-hexadecyl bromide, n-octadecyl chloride, n-octadecyl bromide; etc.

(b) Nitrogen-containing compounds:
Amino—n-octylamine; n-decyl amine; n-hexadecyl amine; n-octadecyl amine; n-octadecenyl amine; methyl, n-octyl amine; butyl, n-octyl amine; phenyl, n-decylamine; etc.
Cyano—n-hexyl nitrile; n-octyl nitrile; n-tetradecyl nitrile; n-octadecyl nitrile; etc.
Nitro—1-nitro-n-decane; 1-nitro-n-dodecane; 1-nitro-n-octadecane; etc.
Amido—n-octanamide; n-dodecanamide; n-octadecanamide; n-octadecenamide; N-methyl, n-octanamide; N-hexyl, n-decanamide; N-phenyl, n-decanamide; etc.
Cyanate and isocyanate—n-hexyl cyanate; n-hexyl isocyanate; n-decyl cyanate; n-decyl isocyanate; n-hexadecyl cyanate; n-hexadecyl isocyanate; etc.
Thiocyanate and isothiocyanate—n-hexyl thiocyanate; n-hexyl isothiocyanate; n-decyl thiocyanate; n-decyl isothiocyanate; n-octadecyl thiocyanate; n-octadecyl isothiocyanate; etc.

(c) Sulfur-containing compounds:
Mercapto—n-octyl mercaptan; n-dodecyl mercaptan; n-hexadecyl mercaptan; n-octadecenyl mercaptan; etc.
Sulfido (SR)—methyl, n-octyl sulfide; butyl, n-dodecyl sulfide; amyl, n-hexadecyl sulfide; etc.
Sulfato—n-dodecyl sulfate; n-hexadecyl sulfate; etc.
Sulfonyl halide—n-decyl sulfonyl chloride; n-dodecyl sulfonyl bromide; n-hexadecyl sulfonyl iodide; etc.

(d) Cyclic substituent: 1-cyclopropyl-n-octadecane; 1-cyclohexyl-n-hexadecane; 1-phenyl-n-octadecane; 1-thienyl-n-octadecane; etc.

It is to be understood that terminally-substituted straight chain compounds containing a second terminal substituent on the opposite terminal carbon atom, are also contemplated herein as plexands. Such disubstituted compounds are also subject to approximately the foregoing relationships of terminal group "width" and chain length. Compounds of this character are represented by the following general formula:

$$X(CH_2)_nX'$$

wherein $n$ is a whole number, and X and X' are the same or different and as defined above.

Illustrative of such compounds are:

1,10-dichlor-n-decane;
1,8-n-octane diamine;
1,10-n-decane diamide;
1,12-n-dodecane dithiol;
1,18-disulfo-n-octadecane; etc.

Another class of compounds contemplated herein as plexands are those having a non-terminal substituent, and being represented by general Formula B:

(B) 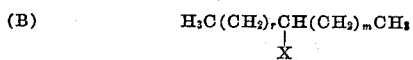

wherein $r$ and $m$ are integers, the sum of which is equal to $n-2$, and $n$ and X are as defined above.

The "length," rather than the "width," of the substituent group (X) roughly determines the minimum carbon chain length required for plexation of the foregoing plexands (B) namely, non-terminally substituted straight chain compounds. These compounds may be considered "secondary plexands." The minimum chain length is also to some extent a function of the position substituted as well as of the chemical nature of the group. Thus, in compounds of this type, the minimum chain length required for plexation is determined by the length of group $H_3C(CH_2)_r$—, if $r$ is small enough so that this alkyl group is shorter in "length" than the substituent group (X). It is possible, bearing this relationship in mind however, also to give rather wide limits in the correlation of group "length" with the minimum chain length required for plexation. The "lengths" of various groups are given in Table III, below, while the correlation of chain lengths with group "lengths" is given in Table IV, also provided below:

TABLE III.

| | | | |
|---|---|---|---|
| —F | 2.06 | —CH₂Cl | 3.11 |
| —NH₂ | 2.17 | —CN | 3.25 |
| —NO₂ | 2.61 | —SO₃H | 3.37 |
| —Cl | 2.76 | —I | 3.43 |
| —SH | 2.85 | -cyclohexyl (average configuration) | 5.09 |
| —Br | 3.05 | =-phenyl | 5.69 |

TABLE IV.—CORRELATION BETWEEN "LENGTH" OF NON-TERMINALLY-SUBSTITUTED GROUPS AND MINIMUM CHAIN LENGTH REQUIRED FOR UREA PLEXATION AT 25° C.

| Group | "Length" (in Å°) | Minimum Chain Length, Number of Carbon Atoms |
| --- | --- | --- |
| 1 | <2.30 | 7–10 |
| 2 | 2.30–2.50 | 10–13 |
| 3 | 2.50–2.80 | 13–18 |
| 4 | 2.80–3.20 | 18–24 |
| 5 | >3.20 | >24 |

It is to be understood, once again, that the limits shown in Table IV apply for plexation at temperatures of about 25° C. Here too, the minimum number of carbon atoms in the chain is somewhat lower for plexation at lower temperatures, but generally not more than one or two carbon atoms lower. Also, a correspondingly higher number of carbon atoms will be required in the chain for a rise in temperature.

Representative of the foregoing plexands are the following:

2-chloro-n-tetracosane;
2-bromo-n-tetracosane;
2-amino-n-decane;
2-nitro-n-octadecane; etc.

Considering the relationships shown by Tables III and IV, it will be seen that 2-chloro-n-octadecane, for example, will form a plexad with urea at about 25° C. This, then, illustrates a plexad comprising a secondary plexand and urea. A further illustration is a non-terminal bromide such as 2-bromo-n-tetracosane.

By way of illustration, it follows from the foregoing that 1-bromo-n-tetracosane is separated readily from a mixture of the same and an isomer such as 2-bromo-n-tetracosane. This is typical of a separation of a compound represented by general Formula A, above, separated from a compound represented by general Formula B, above, wherein the halogen atoms and the number of carbon atoms thereof are the same.

A further illustration stemming from the foregoing data is the efficient separation of 1-chloro-n-octadecane from a mixture of the same and 2-chloro-n-hexadecane; or a mixture of the same and 2-chloro-n-cosane thus demonstrating the separation of a compound represented by general Formula A, above, from a compound represented by general Formula C:

(C) 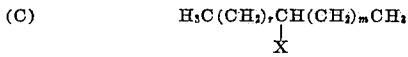

wherein the sum of $r+m$ is other than $n-2$, and wherein the halogen atom is the same as in (A).

As mentioned earlier, two paraffin derivatives of the same chain length but having different substituents can be separated by plexation. This feature is illustrated by selective plexad formation of 1-chloro-n-octane in a mixture containing the latter and 2-bromo-n-octane. This may be referred to as the separation of a monohalide represented by general Formula A from a monohalide represented by general Formula D:

(D) 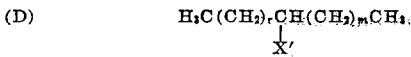

wherein the sum of $r+m$ is equal to $n-2$, and wherein the halogen atom $X'$ is different from $X$ in (A).

Still another separation which is effected readily is that of 1-chloro-n-octane from a mixture containing the same and 2-bromo-n-heptane or a mixture of the same and 2-bromo-n-nonane, that is, wherein the number of carbon atoms and the halogen atoms are different. This is the separation of a compound represented by general Formula A from a compound represented by general Formula E:

(E) 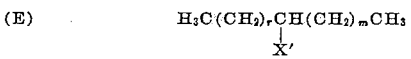

wherein the sum of $r+m$ is other than $n-2$ and wherein the halogen atom $X'$ is different from $X$ in (A).

*(2) Antiplex*

An antiplex, as defined above, is a compound incapable of forming a plexad with a plexor, such as urea.

*(3) Plexor*

The plexor used herein is urea, which is in solution in a single- or multiple-component solvent. This solution should range from partially saturated to supersaturated at the temperature at which it is contacted with a plexand or with a mixture containing one or more plexands and antiplexes, and, in many cases, it will be found convenient to suspend a further supply of urea crystals in the solution, handling it as a slurry. For gravity or centrifugal separation, it is convenient to use a solvent of such a specific gravity that after the formation of a desired amount of plexad, the specific gravity of the solvent phase will be different from that of the plexad phase and of the antiplex phase to a degree sufficient to permit separation by gravity, centrifuging, etc.

The solvent should be substantially inert to the plexand and to the compounds of the mixture and also to the urea. Preferably, it should also be heat stable, both alone and in contact with urea, at temperatures at which the desired plexad is not heat stable.

As indicated above, the solvent may be either single- or multiple-component. It is sometimes convenient, particularly where the plexad is separated by gravity, to utilize a two-component system, as water and an alcohol, glycol, amine or diamine, and preferably a lower aliphatic alcohol such as methanol or ethanol, or a water-soluble amine such as piperidine. Such a solvent, partially saturated to supersaturated with urea, lends itself readily to a continuous process for separation by plexation.

Solutions containing sufficient water in order to minimize the solubility of the hydrocarbon derivatives in the urea solvent are often employed. The minimum quantity of water required in such instances depends upon the polarity and the molecular weight of the hydrocarbon derivative, or plexand, being treated and, in general, this quantity will be greater with more polar plexands and with lower molecular weight compounds.

In certain cases the use of single-component solvents is advantageous. Single-component solvents other than alcohols may be employed, although they are normally not as useful as the lower aliphatic alcohols. Glycols may be employed as single solvents, yet ethylene glycol is generally not suitable in gravity separation operations due to the high density of the urea-saturated solvent. The higher glycols and particularly the butylene glycols may be advantageously employed. Diamines such as diaminoethane, -propane and -butane may likewise be employed. Additional useful solvents include formic acid, acetic acid, formamide and acetonitrile, although the first three of these are subject to the same limitations as ethylene glycol.

Solvents generally useful when mixed with sufficient water, ethylene glycol or ethylene diamine, to render them substantially insoluble in the derivatives being treated, are selected from the class of alcohols such as methanol, ethanol, propanol, etc.; ethers such as ethylene glycol dimethyl ether; and amines such as triethylamine, hexylamine, piperidine. When gravity separation is employed, the mixed solvent is preferably subject to the restriction that the density after saturation with urea must be less than 1.0–1.1.

*(4) Typical separations*

In order that this invention may be more readily understood, typical separations are described below with reference being made to the drawings attached hereto.

(a) *Separation of plexand from antiplex.*—The procedure which may be employed in effecting the separation of terminally-substituted from non-terminally substituted, straight chain hydrocarbons may be essentially the same as that described in copending application Serial No. 4,997, filed January 29, 1948. The plexand obtained in decomposing the plexand obtained in a urea treatment of a mixture of terminally-substituted and non-terminally-substituted, straight chain hydrocarbons is very pure, provided the substituent group and the aliphatic chain length are of such dimensions that only the terminally-substituted hydrocarbon forms a plexad and provided the plexad be carefully freed of occluded antiplex before it is decomposed. For example, substantially pure 1-halide is separated from the plexad obtained in the treatment of terminally-substituted and non-terminally-substituted chlorides or bromides of normal paraffins containing from 8–16 carbon atoms.

In Figure 1, a charge comprising a plexand and an antiplex, for example 1-bromo-n-octane and 2-bromo-n-octane, respectively, enters through line 1, to be contacted with urea solution from line 2, and the charge and solution are intimately mixed in mixer 3. In case the charge undergoing treatment is rather viscous at the temperature of plexad (1-bromo-n-octane-urea) formation, it is advisable to provide a diluent, such as for example, a naphtha cut which may be recycled within the process, as described later, and joins the charge from line 4. Diluent make up is provided by line 5.

From mixer 3, wherein there is achieved an intimate mixture of urea solution and charge, the mixture flows through line 6, heat exchanger 7, and cooler 8 into settler 9. There may be some or a good portion of plexad (1-bromo-n-octane-urea) formed in mixer 3, but in general, it is preferred to operate mixer 3 at a temperature somewhat above that conducive to heavy formation of plexad. Then, in heat exchanger 7, the temperature of the mixture is reduced, and in cooler 8 adjusted, so that the desired plexad is formed. It will be recognized that this showing is diagrammatic, and that the heat exchangers and coolers, heaters, etc., shown will be of any type suitable, as determined by the physical characteristics of the materials being handled.

From cooler 8, the plexad-containing mixture flows into settler 9. This settler is preferably so managed that there is an upper phase of antiplex (2-bromo-n-octane), an intermediate phase of urea solution, and a lower region containing a slurry of plexad in the urea solution. The incoming mixture is preferably introduced into the solution phase, so that the antiplex (2-bromo-n-octane) may move upward and plexand downward, through some little distance in the solution, to permit adequate separation of plexad from antiplex and antiplex from plexad.

Antiplex will be removed from settler 9 by line 10 and introduced into fractionator 11, wherein the diluent is removed, to pass overhead by vapor line 12 and eventually to use through line 4. Recovered antiplex (2-bromo-n-octane) passes from the system through line 13. Obviously if no diluent be used, fractionator 11 will be dispensed with.

Plexand and urea solution, withdrawn from settler 9 through line 14, are passed through heat exchanger 7 and heater 15 to enter settler 16 through line 17. In this operation, the temperature is so adjusted that the plexand (1-bromo-n-octane) is freed from the plexad and, in settler 16, the plexand rises to the top to be recovered from the system by means of line 18. The urea solution, thus reconstituted to its original condition by return to it of that portion of the urea which passed into plexad, is withdrawn from settler 16 by line 2 and returned to process. Naturally, in a process of this kind there are minor mechanical and entrainment losses of urea solution, etc., and urea solution makeup is provided for by line 19.

Figure 2:
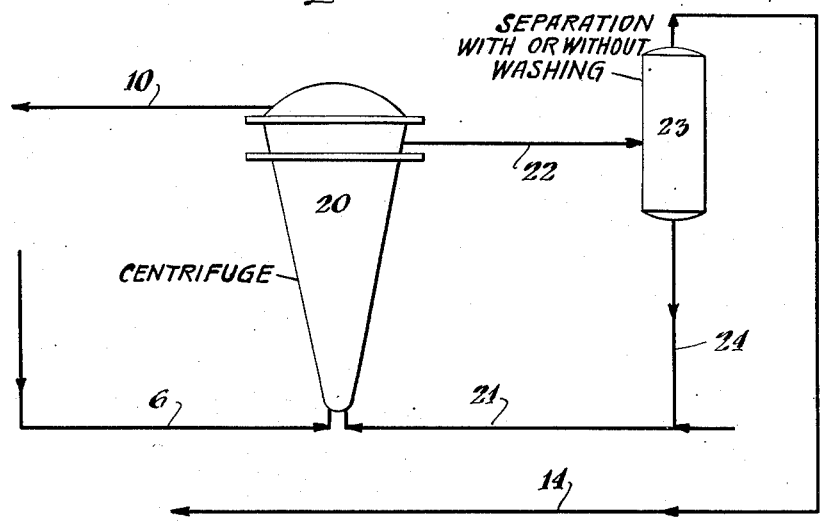

In many cases, the separation of plexand and solution from antiplex may be conducted with greater facility in a centrifuge operation. Such a setup is shown in Figure 2, wherein only the equivalent of that portion of Figure 1 entering about settler 9 is reproduced. Again in diagram form, the cooled mixture containing antiplex, plexad and urea solution enters centrifuge 20 through line 6. In many cases, it will be desirable to utilize a carrier liquid in known manner in this operation and that liquid may be introduced by line 21. Antiplex will be carried off through line 10, and plexad, urea solution, and carrier, if present, pass through line 22 to a separation step, which may include washing and may be carried out in a settler, a filter, or another centrifugal operation, which separation is indicated diagrammatically at 23. Carrier liquid, if used, returns through line 24, and urea solution and plexand pass through line 14. (Note: Lines 6, 10 and 14 are the same lines, for the same functions, as in Figure 1 and are identically numbered).

(b) *Separation of one plexand from a second plexand.*—In the case where both the terminally-substituted and non-terminally-substituted compounds form plexads, a concentration of the terminally-substituted compound will be obtained. The sharpness of separation of the terminally-substituted compound will be greater, the greater the difference in the strength of the plexads formed with the two types of pure compounds. In general, this will be greater, the shorter the carbon chain length of parent hydrocarbon. For example, substantially pure 1-bromo-n-octane can be obtained from a mixture with 2-bromo-n-octane in a single plexation. It is more difficult, however, to obtain separation between 1-chloro-n-octadecane and 2-chloro-n-octadecane.

The following serves to illustrate a procedure for obtaining sharp separation between one plexand, 1-chloro-n-octadecane, and a second plexand, 2-chloro-n-octadecane, the latter behaving as a secondary plexand in forming a plexad. This procedure is similar to a sweating or a solvent sweating procedure used in the refining of slack waxes, and is shown diagrammatically in Figure 3.

In Figure 3, a slurry of solid urea in a saturated urea solvent, which is preferably an aqueous alcoholic solution, is pumped from line 31 into a turbo mixer 32 where it is agitated with a mixture of 1- and 2-chloro-n-octadecanes, which enter through line 33. An immiscible solvent charged through line 34 is also preferably employed, such as a light cut from a straight run naphtha in case the compounds of the mixture treated have: (1) a relatively high viscosity; (2) an appreciable solubility in the urea solvent; or (3) greater density than the urea solvent. The amount of excess solid urea employed should be sufficient so that after the plexation is completed the urea solvent remains substantially saturated with urea.

Internal cooling means may be employed in 32 to further cool the mixture and remove the heat evolved during the plexation. The temperature employed in 32 will depend upon the chain length of the plexand and secondary plexand. If the chain length is such that it is not more than one or two carbon atoms greater than the minimum required to obtain plexation with the pure plexand at 25° C., then temperatures in the range of −10 to 20° C. should be employed. If the chain length is from two to six carbon atoms greater than the minimum, temperature in the range of 15–30° C. should be employed; and if the chain length is greater than six carbon atoms beyond the minimum, temperatures from 25–50° C. may be employed. It will be apparent, then, that conditions of operation vary considerably, conditions selected being those appropriate for the formation of the desired plexad or plexads.

The slurry of plexad, urea solvent and secondary plexand is pumped, by means of pump 36, through line 35 and cooler 37 wherein it may be further cooled if desired, and into gravity settler 38. In settler 38 the secondary plexand plus naphtha solvent rises to the top and is withdrawn through line 39 into fractionator 40. The secondary plexand, predominantly 2-choloro-n-octadecane, is removed as bottoms from fractionator 40 through line 41. The naphtha solvent is taken from fractionator 40 through line 42, cooler 43, tank 44 and line 45 to be employed in solvent sweating zone 46. Naphtha solvent may also be recycled to fractionator 40 through line 47, by means of pump 48.

In settler 38, the slurry of plexand in urea solvent is taken off through line 49, heat exchanger 50 and heater 51 into solvent sweating zone (or mixer) 46. A portion of the clear urea solvent may be removed from the center of 38 and recycled, through line 51 and pump 52, to mixer 32 if desired.

It is to be understood that the gravity settler 38 may be replaced by other separation means such as a centrifuge or rotary filter, etc.

The mixture of solvent and plexad is heated in solvent sweating zone 46 to a temperature sufficient to decompose the major portion of the plexad of the 2-chloro-n-octadecane, while preserving the major portion of the plexad of 1-chloro-n-octadecane. The temperature employed in zone 46 is related to that employed in mixer 32, and will generally be maintained from 10–20° C. higher in zone 46 than in mixer 32.

The partially decomposed plexads, urea solvent, and naphtha mixture is passed from zone 46 through line 53 to settler 54. The naphtha containing plexand, 1-chloro-n-octadecane, and some secondary plexand, 2-chloro-n-octadecane, is recycled through lines 55 and 33 to mixer 32. The slurry of undecomposed plexad is withdrawn from the bottom of settler 54 through line 56, heat exchanger 57, heater 58 into settler 59. The plexad is thus heated hot enough to cause complete decomposition or reversion of the plexads and solution of the urea in the urea solvent. Temperatures in the range of 55–85° C. are generally suitable.

Plexand, 1-chloro-n-octadecane, contaminated with naphtha which had been occluded on the corresponding plexad (1-chloro-n-octadecane-urea) is withdrawn through line 60 into fractionator 61. Naphtha is taken off overhead from fractionator 61 through line 62, cooler 63, tank 64, pump 65 and line 66, to mixer 31. A portion of the naphtha may also be recycled to fractionator 61 through line 67. Plexand is recovered as bottoms through line 68.

Urea solution is recycled from the bottom of settler 59 through line 69, pump 70, heat exchangers 57 and 50, and line 51.

Plexand of any desired purity may be obtained by either: (1) increasing the fraction of the total plexad decomposed in the solvent sweating zone 46, or (2) including a multiplicity of alternating solvent sweating zones 46 and settling zones 54 operated in series.

VII. ILLUSTRATIVE EXAMPLES

The following examples serve to illustrate, and not in any sense limit, the present invention.

(a) *Terminally-substituted straight chain paraffins. General Formula A.*—A number of such paraffin derivatives of varying chain length were agitated for several hours with water or with aqueous methanol solutions saturated with urea, and plexad formation was evidenced by resulting precipitate. The results are summarized in Table V, below, and the minimum chain length required for plexation found experimentally is compared with the correlations given in Table IV. Table V is as follows:

TABLE V.—COMPARISON OF MINIMUM CHAIN LENGTHS REQUIRED FOR UREA PLEXATION AT 25° C. FOR HYDROCARBONS-1 DETERMINED EXPERIMENTALLY WITH THOSE GIVEN IN TABLE II. PLEXAD FORMATION-ALIPHATIC CHAIN LENGTH

| Group | 4 | 5 | 6 | 7 | 8 | 10 | 12 | 16 | 18 | Group No. | Minimum Chain Length Correlation Table II |
|---|---|---|---|---|---|---|---|---|---|---|---|
| —CONH$_2$ | No | | | | Yes | | | | | 1 | 5–8 |
| —Cl | No | No | | | Yes | | | Yes | Yes | 1 | 5–8 |
| —Br | No | | | Yes | Yes | | | Yes | Yes | 1 | 5–8 |
| —CN | | | | | Yes | | | Yes | Yes | 1 | 5–8 |
| —NH$_2$ | | | | | Yes | | | Yes | Yes | 1 | 5–8 |
| —thienyl | | | | | | | No | | Yes | 3 | 12–18 |

It will be noted from the data set forth in Table V that, in all instances, experimental values found for the minimum chain length are within the limits specified in Table II.

(b) *Comparison of equilibrium values in the plexation of compounds of General Formula A and B.*—Plexation of a plexand, dissolved in an antiplex such as a suitable branched chain hydrocarbon solvent, with a saturated urea solution proceeds until the concentration of the plexand is reduced to a certain minimum concentration which may be termed the "equilibrium concentration." In general, the "equilibrium concentration" is lower, the lower the temperature of plexation and is dependent only upon the temperature and not upon the solvent for the plexand, provided the urea solution is maintained saturated with urea and provided the plexand-solvent phase can be regarded as an ideal solution.

Equilibrium values were determined for several pairs of compounds, (A) and (B), by agitating solutions of varying concentrations of the substituted hydrocarbon in isooctance with a 70% methanol-30% water solution saturated with urea and noting the minimum concentration required for plexad formation. The results are summarized in Table VI, below.

TABLE VI.—EQUILIBRIUM VALUES IN THE UREA PLEXATION OF HYDROCARBON-1, HYDROCARBON-2 PAIRS

| Group | Structure | Equilibrium Conc., Vol. Percent | Temp., ° C. |
|---|---|---|---|
| —Cl | $CH_3(CH_2)_6$—$CH_2Cl$ | 13.7 | 25 |
| | $CH_3CH$—$(CH_2)_5CH_3$<br>\|<br>Cl | No Plexad | 25 |
| —Br | $CH_3(CH_2)_6CH_2Br$ | 19.4±1.0 | 31 |
| | $CH_3CH$—$(CH_2)_5CH_3$<br>\|<br>Br | No Plexad | 30 |

From the data shown in Table VI, it will be noted that the terminally-substituted compound, (A), forms a plexad, while the non-terminally-substituted compounds, (B), do not form plexads. When the compound (B) does not form a plexad, relatively sharp separation can be obtained between compounds (A) and (B) in a single plexation.

(c) *Separation of 1-bromo-n-octane and 2-bromo-n-octane.*—The following solution was contacted with urea, in a reaction vessel: equal parts by volume of 1-bromo-n-octane, 2-bromo-n-octane and 2-methyl pentane. A portion, 45 parts by volume, of this solution was agitated at room temperature (25° C.) with 50 parts by volume of an aqueous 80% methanol solution saturated with urea at 45° C. A plexad was formed and settled to the bottom of the urea solution. The upper layer, free of plexad, was decanted from the lower layer. The upper layer was distilled whereupon 2-methyl pentane was distilled off, and the composition of the bromide residue was determined by refractive index measurement.

The plexad was filtered from the urea solution, washed with 2-methyl pentane and then decomposed with water to urea and plexand. The recovered plexand was distilled to remove 2-methyl pentane and the residue was analyzed for the bromo-octanes by refractive index.

No 2-bromo-n-octane was removed from the original solution, while the bromo-n-octane content was reduced from 33.3 volume per cent to its equilibrium value, namely, 18.7 volume percent.

VIII. UTILITY

From the foregoing description, it will be apparent that the invention has considerable application in the chemical and related arts. For example, terminally sulfonated paraffins may be separated from the non-terminally substituted compounds in the manufacture of detergents and wetting agents by the sulfochlorination of paraffins. This makes possible purer and more efficient detergents and wetting agents. Similarly, 1-chloro straight chain paraffins may be separated from the corresponding non-terminally substituted chloro compounds, which are formed in the chlorination of straight chain paraffins. Also, in the high temperature, vapor-phase chlorination of olefins, two principal products are produced, namely, the 1-chloro-2-olefin and the 3-chloro-1-olefin according to the following representation:

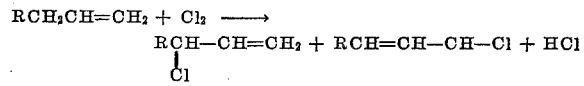

The present method may be employed to effect the separation between the foregoing 1-chloro and the 3-chloro compounds.

The addition of a mercaptan or hydrogen bromide to a 1-olefin in the presence of air, oxygen or peroxides takes place with the addition of the mercapto radical, —SR, or bromo radical, —Br, to the terminal carbon atom of the olefin. If an olefin mixture containing a straight chain 1-olefin is so treated, the derivatives obtained from the straight chain 1-olefin can be selectively separated by urea plexation. The 1-olefin derivatives obtained in this manner may be used for various purposes, or can be converted by known reactions to other useful products. For example, the bromide may be pyrolyzed to regenerate the pure 1-olefin.

Not only are the separation procedures contemplated herein useful for removing substantial amounts of a contaminating constituent, as an isomer or isomers, from a related compound, but they are of value when small or trace amounts of such an undesirable constituent are present.

In addition, the new plexads made available herein constitute desirable sources of urea and of the various plexands associated therewith. For example, the desired compounds can be kept in storage or shipped until just prior to use, when they are separated by reversion of the plexads.

Compounds characterized by a nitrogen-containing substituent are also plexated from mixtures containing the same and form plexads with urea, as described above; this subject matter is also described and is claimed in application Serial No. 115,515, now Patent No. 2,681,332, issued June 15, 1954. Sulfur-containing compounds are also plexated from their mixtures, and form plexads with urea, as described above and as described and claimed in application Serial No. 255,943, filed November 13, 1951 (now Patent No. 2,681,336, issued June 15, 1954) as a continuation of application Serial No. 115,516 which has been abandoned. Plexation of compounds containing cyclic substituents, and urea plexads thereof, are described and are claimed in application Serial No. 116,593 (now Patent No. 2,681,334, issued June 15, 1954), in the same manner as described above. Plexation with urea of various terminally substituted compounds from mixtures containing the same and non-terminally substituted compounds, described above, is also described and is claimed in application Serial No. 115,517, now Patent No. 2,681,333, issued June 15, 1954.

Urea plexation of a non-terminally mono-substituted compound from mixtures containing the same and a non-terminally poly-substituted compound is described and is claimed in application Serial No. 115,513, now Patent No. 2,642,422, issued June 16, 1953. Urea plexation of mixtures containing aliphatic compounds of different degrees of unsaturation is described and is claimed in application Serial No. 115,514, now abandoned; similarly, plexation of mixtures containing aliphatic hydrocarbons of different degrees of unsaturation and urea plexads of such hydrocarbons, are described and are claimed in application Serial No. 115,518 (now Patent No. 2,642,423, issued June 16, 1953) and in divisional application thereof Serial No. 266,547, filed January 15, 1952.

Said applications Serial Nos. 115,513 through 115,518 and 116,593 were filed on September 13, 1949.

I claim:

1. Crystalline complex of urea and a straight chain alkyl monohalide consisting of carbon, hydrogen and halogen, and having the halogen atom thereof joined to other than a terminal carbon atom of the chain, said monohalide being selected from the group consisting of a fluoride having at least seven carbon atoms in the chain, a chloride having at least eighteen carbon atoms in the chain, a bromide having at least twenty carbon atoms in the chain, and an iodide having at least twenty-four carbon atoms in the chain.

2. Crystalline complex as defined by claim 1 wherein said monohalide is a fluoride.

3. Crystalline complex as defined by claim 1 wherein said monohalide is a chloride.

4. Crystalline complex as defined by claim 1 wherein said monohalide is a bromide.

5. Crystalline complex as defined in claim 1 wherein said monohalide is an iodide.

References Cited in the file of this patent
UNITED STATES PATENTS

| | | |
|---|---|---|
| 2,520,715 | Fetterly | Aug. 29, 1950 |
| 2,557,257 | Melrose | June 29, 1951 |
| 2,569,984 | Fetterly | Oct. 2, 1951 |
| 2,642,422 | Gorin | June 16, 1953 |
| 2,681,333 | Gorin | June 15, 1954 |
| 2,702,289 | Bowman et al. | Feb. 15, 1955 |